US008616620B2

(12) United States Patent
Clark et al.

(10) Patent No.: US 8,616,620 B2
(45) Date of Patent: Dec. 31, 2013

(54) YARD TRACTOR WITH REMOTE CONTROLLED REAR ACCESS DOOR

(75) Inventors: Stephen Clark, Menifee, CA (US); Robert P. Kelly, San Pedro, CA (US)

(73) Assignee: SSA Terminals (Long Beach), LLC, Long Beach, CA (US)

(*) Notice: Subject to any disclaimer, the term of this patent is extended or adjusted under 35 U.S.C. 154(b) by 86 days.

(21) Appl. No.: 13/194,857

(22) Filed: Jul. 29, 2011

(65) Prior Publication Data

US 2013/0026787 A1 Jan. 31, 2013

(51) Int. Cl.
*B62D 33/06* (2006.01)
*B60J 5/12* (2006.01)

(52) U.S. Cl.
USPC .............. 296/190.11; 296/190.01; 296/146.4; 296/146.8

(58) Field of Classification Search
USPC ............... 296/190.01, 190.08, 190.11, 146.1, 296/155, 146.4, 146.8, 146.9; 49/404, 414
See application file for complete search history.

(56) References Cited

U.S. PATENT DOCUMENTS

| 2,109,128 | A | | 2/1938 | Carrillo | |
|---|---|---|---|---|---|
| 2,552,356 | A | | 5/1951 | Weigele | |
| 2,563,845 | A | * | 8/1951 | Johnson | 296/146.16 |
| 3,582,132 | A | * | 6/1971 | Gunning | 296/190.05 |
| 3,858,920 | A | | 1/1975 | Erickson | |
| 4,272,923 | A | | 6/1981 | Anderson | |
| 4,290,368 | A | | 9/1981 | Mazzini | |
| 4,930,256 | A | | 6/1990 | Kawanishi et al. | |
| 5,002,332 | A | * | 3/1991 | Ikeda | 296/190.11 |
| 5,148,631 | A | * | 9/1992 | Bayard et al. | 49/449 |
| 5,532,521 | A | * | 7/1996 | Leininger | 307/10.2 |
| 6,257,651 | B1 | * | 7/2001 | Morbach et al. | 296/146.13 |
| 6,494,519 | B2 | * | 12/2002 | Sturgin et al. | 296/50 |
| 7,185,943 | B2 | * | 3/2007 | Lesle et al. | 296/146.16 |
| 7,328,933 | B2 | * | 2/2008 | Vitale et al. | 296/146.4 |
| 7,497,501 | B2 | * | 3/2009 | Seidel | 296/146.4 |
| 7,695,055 | B2 | * | 4/2010 | Tsukamoto | 296/190.11 |
| 7,934,767 | B2 | * | 5/2011 | Kim et al. | 296/190.11 |
| 8,146,985 | B2 | * | 4/2012 | Nelson | 296/146.8 |
| 8,303,026 | B2 | * | 11/2012 | Yamashita et al. | 296/190.1 |
| 2006/0119132 | A1 | * | 6/2006 | Rivers et al. | 296/146.4 |
| 2007/0138832 | A1 | * | 6/2007 | Kraus et al. | 296/155 |

OTHER PUBLICATIONS

2009 Chrysler Town & Country with powered liftgate and sliding doors on carmax.com Picture 40 of 42 shows the ceiling mounted control device for the driver's station.*

* cited by examiner

*Primary Examiner* — Glenn Dayoan
*Assistant Examiner* — Gregory Blankenship
(74) *Attorney, Agent, or Firm* — Fulwider Patton LLP

(57) ABSTRACT

A yard tractor incorporating a fluid cylinder pressurized by fluid from a control valve actuated by a switch accessible from the driver's seat.

20 Claims, 4 Drawing Sheets

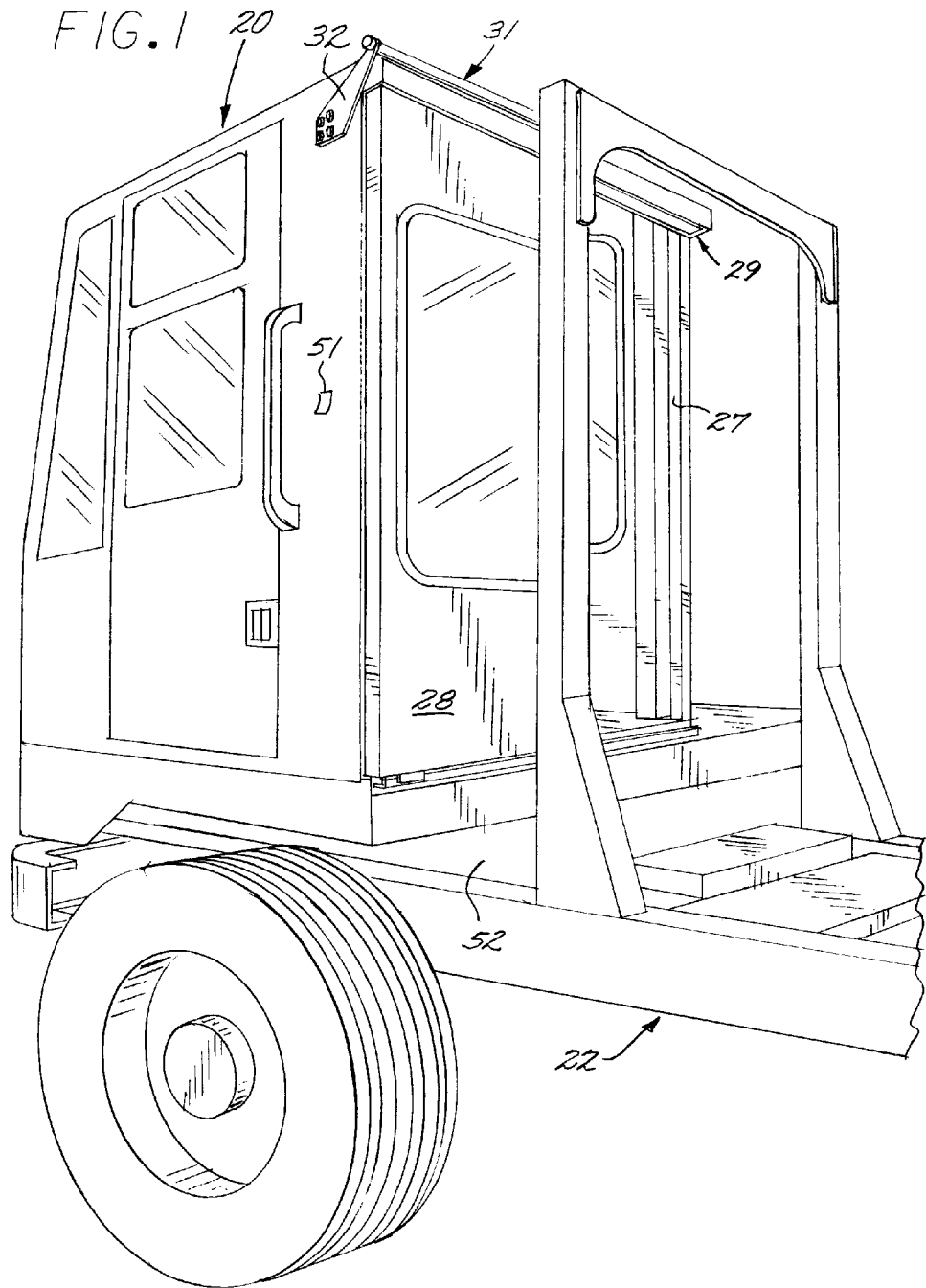

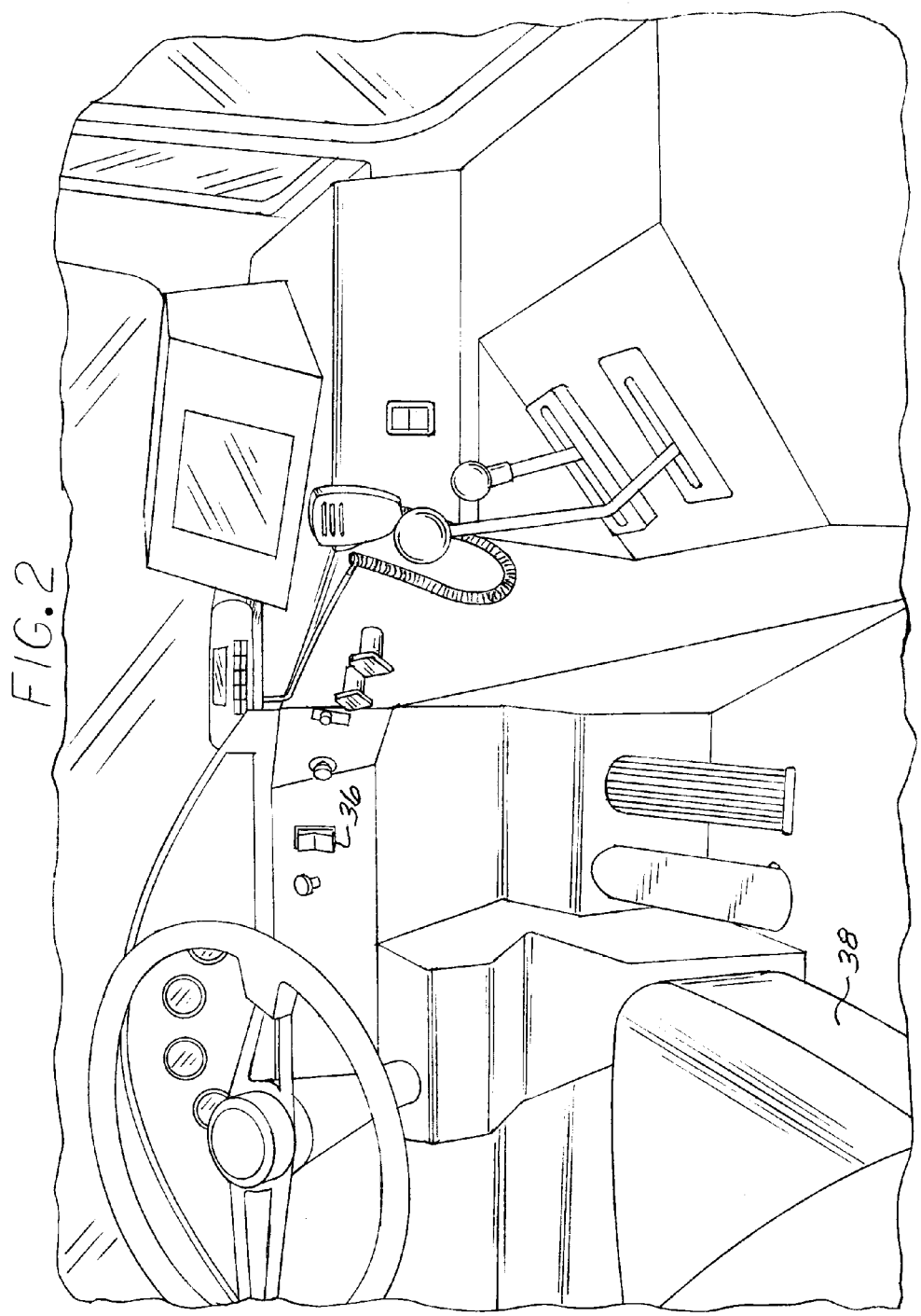

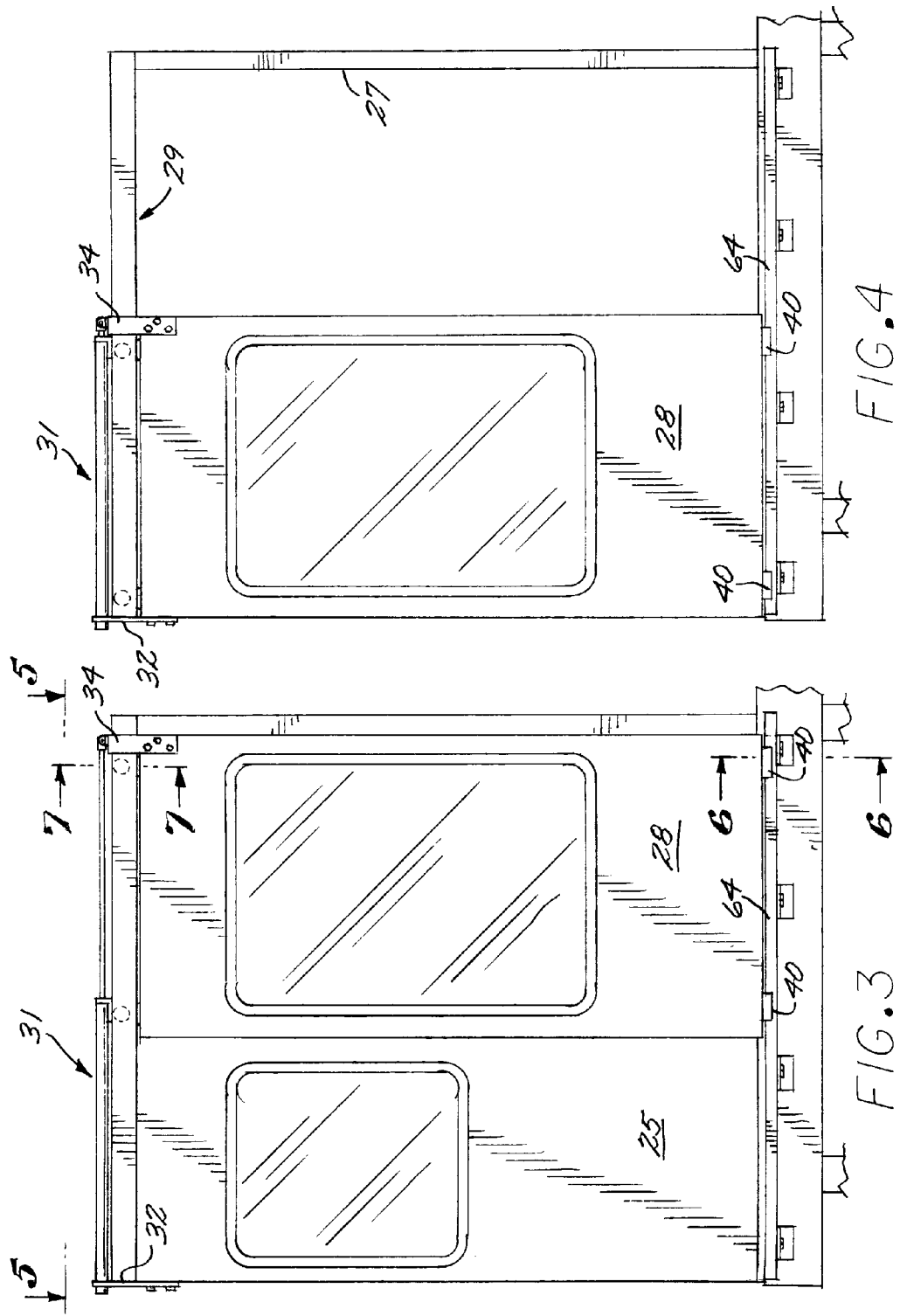

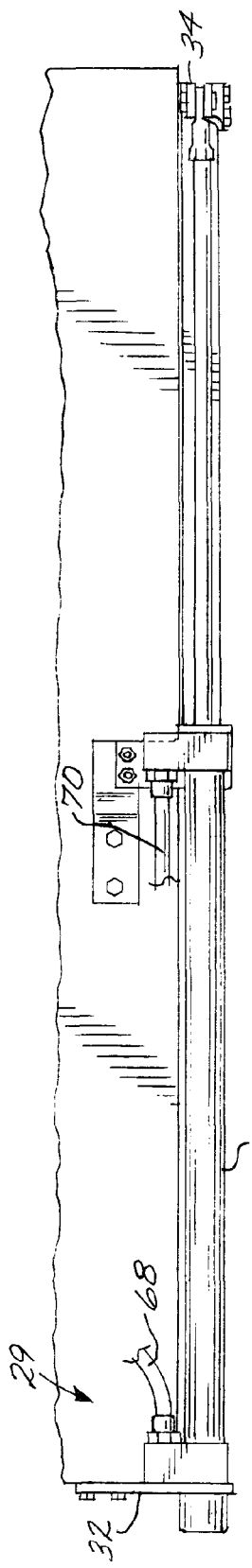
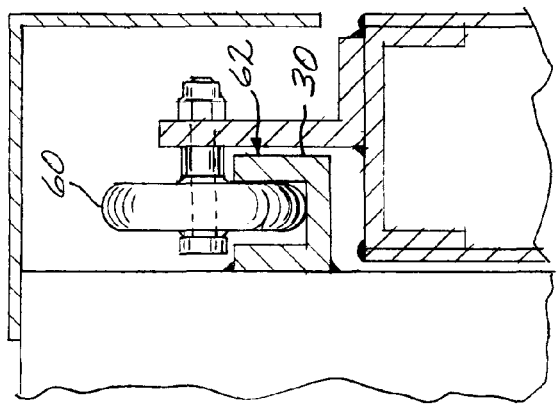
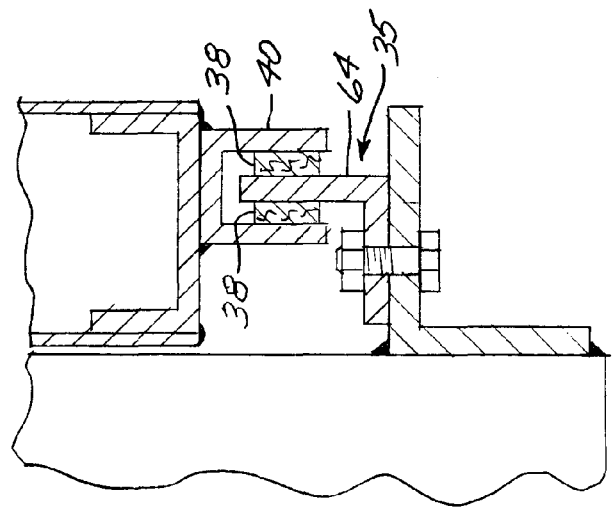

YARD TRACTOR WITH REMOTE CONTROLLED REAR ACCESS DOOR

BACKGROUND OF THE INVENTION

1. Field of the Invention

The present invention relates to marine cargo container transfer devices and particularly to yard tractors utilized to transport cargo containers between yard locations and destinations, such as a location for loading on board ships or on board railway cars or the like.

2. Brief Description of the Prior Art

Yard tractors have long been known that include a driver's cab for hauling a flatbed truck trailer designed to receive a container of cargo which may weigh many tons. The cost of lay time for large cargo ships at the dock is significant, on the order of tens of thousands of dollars per hour or per day, thus rendering efficiency and speed in the transport and loading of the cargo containers of great importance. Typically, such yard tractors have included a cab with a rear doorway so that the driver can exit the driver's seat and access a container or other cargo on the trailer or flatbed. These doorways are typically closed by means of a door slidable along a transverse track and typically latched in either their open or closed position by means of a manual latch including a handle for grasping by the driver. The doors themselves are relatively sturdy and of considerable weight, presenting significant inertia which requires substantial force to slide into the desired position.

The doors typically incorporate a viewing window through which the driver, with his or her head turned, can view any obstacles behind the trailer while backing up or during the loading process or while the container is being loaded on or offloaded from the trailer. Because the mechanical latch handles are typically mounted to the door below the window, this limiting the space available for the window and restricting the driver's view.

Drivers will typically have frequent access to such doors for opening and closing thereof and the doors themselves may have substantial weight, thus affording significant resistance to opening or closing. Accordingly, due to the posture assumed by a driver turning his or her head and neck to view rearwardly while grasping the handle, drivers are placed in a generally compromising position for applying forces which will tend to torque their backs, too often resulting in injury, possible loss of work time for medical attention, and sometimes even incapacitating the driver preventing him or her from serving in his or her driving duties while recovering.

One of the great concerns over operation of heavy equipment in and around yards for storing and moving heavy seagoing cargo containers is the safety of the crane and tractor operators. It is well known that in the workplace, injury very often occurs to the lower back from certain maneuvers that may be undertaken on a day to day basis by a workman such as the driver of a tractor. Lower back movement is a combination of basic flexion, extension and rotation movements. Flexion is when the driver's trunk bends forward and to the side, e.g., leaning over a control or the like and then turning sideways. The rectus, abdominis, internal and external obliques and hip flexors perform these movements. Extension is when the back strains from a bent position or extends from an erect position, e.g., picking up something from the floor of a tractor or reaching for a latch in a lower location within the tractor. The erector spinae, the quadratus, lumborum, in combination with gluteus maximus and hamstrings, perform this movement. Rotation is twisting of the trunk about the waist, e.g., turning to one's side while, for instance, sitting on a driver's seat to reach a control or latch which might be to the rear of the driver's seat. The rectus abdominis, obliques and rector spinae are all involved in rotation movements. These are the basic movements, but the back can move in any combination of these.

For example, reaching up and to the side to grasp a latch is a combination of extension and rotation. Throughout operation of a tractor and performing various functions in opening and closing doors and the like, the back is performing many complex movements involving the muscles in the stomach, hips and low back. What is more, these movements can occur from a sitting position or even a standing position at a steering wheel. For example, sitting at the steering wheel is flexation from a lying and bending down to grasp a latch is flexation from a standing position. It is also important when the back does not move. That is, in performing a maneuver while standing or sitting, it is important that the spine maintain close to ideal posture and alignment. Treatment of injuries resulting various of these maneuvers without proper alignment has led to the recognition of various terms, such as a neutral position, which refers to the low back or lumbar segment of the spine as neither extended nor flexed, with the pelvis flat or not tilted. From this, it can be seen that drivers in a yard tractor required to make maneuvers from the driver's seat which might demand that the driver rotate his or her upper torso and, while so rotated, apply forces such as that which might be necessary to actuate a manual latch and/or slide a rear door between opened and closed positions can lead to unnecessary injury, chronic pain, and even the disability of the driver. It is this problem that stems from the prior art trucks which require latching and unlatching of the rear door by the driver, thereby exposing the driver to such injuries to the lower or mid-back and often resulting in severe medical conditions requiring attention and medical treatment.

In recognition of some of the attendant problems, it has been proposed to provide an air cylinder for assisting in opening and closing of the door. While helpful, such systems still require that the driver turn the neck and shoulders to access the latch for latching the door in its open or closed position, thus applying torque to the lower back and continuing to subject the driver to injury.

SUMMARY OF THE INVENTION

The present invention is characterized by a yard truck having a cab with a back doorway and including a laterally movable door driven by a fluid cylinder between open and closed positions and, by maintaining fluid pressure on one or the other ends of the piston, holding the door in its open or closed position without the necessity of a mechanical latch. A preferential embodiment incorporates a door with an air-actuated cylinder which might have multiple telescopical sections to afford the necessary reach for full travel of the door between its open and closed position.

The features and advantages of the invention will be more readily understood from the following detailed description which should be read in conjunction with the accompanying drawings.

BRIEF DESCRIPTION OF THE DRAWINGS

FIG. 1 is a perspective view of a cab of a yard truck incorporating the remote actuated door system of the present invention;

FIG. 2 is a perspective view, in enlarged scale, of the interior of the cab shown in FIG. 1;

FIG. 3 is a back view of the door incorporated in the cab shown in FIG. 1;

FIG. 4 is a back view similar to FIG. 3, but with the door open;

FIG. 5 is a top view, in enlarged scale, taken long the line 5-5 of FIG. 3;

FIG. 6 is a partial vertical sectional view, in enlarged scale, taken along the line 6-6 of FIG. 3;

FIG. 7 is a vertical sectional view, in enlarged scale, taken along the line 7-7 of FIG. 3.

DETAILED DESCRIPTION OF THE PREFERRED EMBODIMENTS

The yard truck of the present invention includes, generally, a cab 20 mounted on a chassis also having a trailer 22 on to which cargo containers or the like may be loaded. The cab includes a back wall 25 having a doorway 27 on one side thereof, a track 6 over the doorway, and a door being carried on such track by wheels (not shown). A fluid cylinder 31 is mounted on one end to the wall of the truck cab by a bracket 32 and the opposite end is coupled to the door by a bracket 34. A control button 36 adjacent the driver's seat 38 controls pressure in a fluid system, generally designated 29, for selectively applying pressure to the opposite ends of the piston of the cylinder for driving the door to either its closed position as shown in FIG. 3 or the open position as shown in FIG. 3 and maintaining a slight 3 or 4 psi pressure on the piston to this maintain the door in its selected position without the necessity of mechanical latching or the like.

In the preferred embodiment the door in track 26 includes an upwardly opening channel 30 (FIG. 7) mounted on the rear wall 28. Mounted to the top door is an angle iron 32 conveying wheel assemblies including wheel 34 nested in an upwardly opening channel facing the track 20.

Mounted on the back wall of the truck cab 20 underneath the edge of the doorway is a horizontal angle iron 35 which includes an upstanding flange 36 and opens upwardly to be captured between low friction pads 38 of downwardly opening U-brackets 40 mounted on the bottom of the door to constrain the door against swinging or moving away from the back wall of the cab.

Connected in pneumatic circuit with the tractor's air compressor and forming part of the pneumatic system are a series of air lines 68 and 70 which lead to the opposite ends of the cylinder 31 for selectively pressurizing the selected end of the cylinder. A spool valve or the like is driven by a solenoid or may be what is known as a rocker switch and equivalent prime mover actuated by the switch 36 carried from the dash of the tractor for convenient access by the driver. The switch serves to actuate the solenoid to shuttle the spool valve between selected positions for pressurizing or venting the opposite ends of the cylinder 31 for the purpose of moving the door 28 selectively to its open or closed position and maintaining a low pressure, as for instance 3 to 4 psi, on the door to maintain it in its position to prevent unwanted movement from the selected open or closed position of the door which could cause injury to the driver or result in hindering his or her access to or from the cab of the vehicle. In some embodiments, we utilize higher pressure from the air compressor, as for instance 6-7 psi to hold the door open. In some embodiments, we apply a relatively high pressure to overcome the momentum of the door to effect the opening or closing operation and then switch to lower pressure air from a pressure regulator to apply the lower pressure air to hold the door in its open of closed position.

As will be recognized by those skilled in the art, the actuating cylinder may take many different forms such as a hydraulic cylinder. In the preferred embodiment, we incorporate an exterior actuating switch depicted as switch 51 (FIG. 1) on the side of the cab accessible from the catwalk 52 at the back of such cab for access by the driver or operator while walking along the catwalk so he or she may also operate the door from the exterior of the cab. In other embodiments the switch is located on the opposite side of the cab. The switch itself may be a rocker switch as shown, a toggle switch or individual "open" or "closed" switches as dictated by the preference of the manufacturer.

In operation it will be appreciated that the fluid cylinder system is inexpensive to manufacture and install and provides reliable operation. The driver can, while sitting in the driver's seat, maneuver the yard truck in position to, for instance, receive a cargo container from an overhead crane or the like. Should the driver need to exit the cab to access the flat bed trailer or the like or otherwise deal with container latching mechanisms or facilities on the flatbed, he or she can reach forwardly from the driver's seat to actuate the switch 36 to the open position, thereby shuttling the spool valve and releasing pressure from the left hand end of the cylinder as viewed in FIG. 3, and pressurizing the right hand end causing the piston to segments to telescope together, thereby drawing the door 28 to the left as viewed in FIG. 3, thus driving the door toward its open position to a distance dictated by the door striking a stop at the left end of the track 26. The spool valve is then operative to maintain a pressure bias in the right hand end of the cylinder to maintain the cylinder segments telescopically together in their collapsed position, thus holding the door in its open position to prevent interference as the driver exits the cab and performs his or her work on the catwalk or in the flatbed area, and then re-enters the vehicle.

If there should be any need for the driver to close the door 28 while on the catwalk 52, he or she may actuate the exterior switch 51 to thereby reverse pressurization on the cylinder 31 by relieving pressure from the right hand end and pressurizing the left hand end to thereby expand the telescoped sections of the cylinder to drive the door to its closed position. As will be appreciated by those skilled in the art, the pneumatic system may be designed to maintain slightly elevated pressures at one or more of the positions of the cylinder cycle, such as to hold the door in its closed position.

Alternatively, assuming that the door has remained open as the driver completes his or her work on the catwalk, he or she then may reenter the cab and be seated in the driver's seat or stand at the driver's console and, while so doing, can easily reach the interior control switch and operate that switch 31 to reverse the pressurization on the cylinder 31 to thereby extend the telescoped position of the cylinder and close the door 25 by rolling along the track to abut the stop at the right hand end of the track 26.

From the foregoing it will be appreciated that the gantry tractor apparatus of the present invention provides a convenient means for controlling the positioning of the rear door on the tractor cab without the necessity of manual latches or the like which would otherwise require access to operation by the driver, typically requiring application of manual forces from positions which are sometimes awkward, thus exposing the driver to the risk of injury and possible pain or suffering.

The invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

We claim:
1. A yard tractor apparatus comprising:
a tractor cab having a driver's station and including a rear wall formed at one side with a rear door opening;
a laterally extending door track on the rear wall;
a door suspended from the track;
rollers for mounting the door from the track;
a retainer rail on the bottom of the rear wall for retaining the bottom of the door adjacent the rear wall;
an air cylinder having opposite ends, connected between the door and the cab for moving the door between open and closed positions;
an air pressure system for pressurizing the opposite ends of the cylinder and being operative when one end or the other is pressurized to selectively move the door in its respective open or closed position and to maintain the door in the respective open or closed position;
interior and exterior control switches, the interior control switch mounted adjacent the driver's station in the cab, and the exterior switch being mounted to the exterior of the cab for controlling pressure to the opposite ends of the cylinder.

2. The yard tractor of claim 1 wherein:
the interior switch is a rocker switch.

3. The yard tractor of claim 2 wherein:
the exterior switch is a rocker switch.

4. A cargo container transport truck comprising:
a chassis including a truck cab and a driver's seat and having a back wall formed at one side with a back door opening;
a door for closing the opening;
a track on the back wall extending over the opening and projecting laterally thereof;
a roller assembly for carrying the door from the track for travel between a closed position and an open position clear of the doorway;
a fluid cylinder connected on one end to the back wall and on the other end to the door and including a double ended piston for receiving fluid on the opposite sides thereof;
a pressurization system for selectively pressurizing the opposite ends of the cylinder to move the door between the open and closed positions and for, when the door is shifted to its closed position, maintain pressure on the cylinder to maintain the door closed and to, when the door is shifted to its open position, maintain pressure on the cylinder to maintain the door in its open position; and
a control panel adjacent the driver's seat, including a control accessible by a driver sitting in the seat to actuate the pressurization system to selectively pressurize the opposite ends of the cylinder.

5. The cargo container transport truck of claim 4 wherein:
the fluid cylinder is an air cylinder.

6. The cargo container transport truck of claim 4 wherein:
the control includes a rocker switch.

7. The cargo container transport truck of claim 5 that includes:
a switch mounted on the exterior of the cab for access from the rear of the cab to actuate the pressurization system.

8. A cargo container transport truck comprising:
a chassis including a truck cab and a driver's seat and having a back wall formed at one side with a back door opening;
a door for closing the opening;
a track on the back wall extending over the opening and laterally thereof;
a roller assembly for carrying the door from the track for travel between a closed position and an open position clear of the doorway;
power means connected between the back wall and door for opening and closing the door;
control means for controlling the power means;
a control switch adjacent the driver's seat, accessible by a driver sitting in the seat to actuate the control means; and
biasing means for selectively holding the door in its open position.

9. The cargo container transport truck of claim 8 wherein:
the power means include a fluid cylinder.

10. The cargo container transport truck of claim 8 wherein:
the control panel includes a rocker switch.

11. The cargo container transport truck of claim 8 that includes:
a second control panel on the back wall for access from the rear of the cab for to actuate the control means.

12. The cargo container transport truck of claim 8 wherein:
the power means includes a fluid cylinder; and
the control means includes a fluid lines for pressurizing the opposite ends of the cylinder.

13. The cargo container transport truck of claim 8 wherein:
the control means includes means for, when the door is in its respective open and closed positions, biasing the door to the respective open and closed positions.

14. A cargo container transport truck comprising:
a chassis including a truck cab and a driver's station and having a back wall formed at one side with a back door opening;
a door for closing the opening;
a track on the back wall extending over the opening and laterally thereof;
a roller assembly for carrying the door from the track for travel of the door between a closed position covering the opening and an open position clear of the doorway;
driver means connected between the back wall and door for opening and closing the door;
control means for controlling the driver means;
a control device adjacent the driver's station, accessible by a driver at the station to actuate the control means; and
biasing means for selectively holding the door in its open position.

15. The cargo container transport truck of claim 14 wherein:
the driver means is a pneumatic cylinder.

16. The cargo container transport truck of claim 14 wherein:
the power means include a fluid cylinder.

17. The cargo container transport truck of claim 14 wherein:
the control means includes a rocker switch.

18. The cargo container transport truck of claim 14 that includes:
a second control device on the back wall for access from the rear of the cab to actuate the control means.

19. The cargo container transport truck of claim 14 wherein:
the drive means includes a fluid cylinder; and
the control means includes a fluid lines for pressurizing the opposite ends of the cylinder.

20. The cargo container transport truck of claim 14 wherein:
the control means includes means for, when the door is in its respective open and closed positions, biasing the door to the respective open and closed positions.

* * * * *